United States Patent
Narayanan et al.

(10) Patent No.: US 6,756,145 B2
(45) Date of Patent: Jun. 29, 2004

(54) ELECTRODE AND INTERCONNECT FOR MINIATURE FUEL CELLS USING DIRECT METHANOL FEED

(75) Inventors: Sekharipuram R. Narayanan, Arcadia, CA (US); Thomas I. Valdez, Covina, CA (US); Filiberto Clara, Prosser, WA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/994,907

(22) Filed: Nov. 26, 2001

(65) Prior Publication Data

US 2002/0102449 A1 Aug. 1, 2002

Related U.S. Application Data

(60) Provisional application No. 60/253,423, filed on Nov. 27, 2000.

(51) Int. Cl.[7] .............................. H01M 8/10; H01M 8/24
(52) U.S. Cl. ............................ 429/32; 427/115; 429/34
(58) Field of Search ................................ 429/30, 32, 34, 429/38, 39; 427/115; 29/623.5

(56) References Cited

U.S. PATENT DOCUMENTS

| | | | |
|---|---|---|---|
| 4,450,212 A | 5/1984 | Feigenbaum et al. | |
| 4,537,840 A | 8/1985 | Tsukui et al. | |
| 5,108,849 A | 4/1992 | Watkins et al. | |
| 5,230,849 A | 7/1993 | Hsu | |
| 5,393,619 A | 2/1995 | Mayer et al. | |
| 6,127,059 A | * 10/2000 | Kato | 204/283 |
| 6,146,781 A | 11/2000 | Surampudi et al. | |

FOREIGN PATENT DOCUMENTS

| | | | |
|---|---|---|---|
| DE | 19624887 A1 | * | 1/1997 |
| JP | 59-73852 | | 4/1984 |

OTHER PUBLICATIONS

U.S. patent application publication No. 2002/0058175 A1, published May 16, 2002.

* cited by examiner

Primary Examiner—Bruce F. Bell
Assistant Examiner—Jonathan Crepeau
(74) Attorney, Agent, or Firm—Fish & Richardson P.C.

(57) ABSTRACT

An improved system for interconnects in a fuel cell. In one embodiment, the membranes are located in parallel with one another, and current flow between them is facilitated by interconnects. In another embodiment, all of the current flow is through the interconnects which are located on the membranes. The interconnects are located between two electrodes.

14 Claims, 1 Drawing Sheet

ELECTRODE AND INTERCONNECT FOR MINIATURE FUEL CELLS USING DIRECT METHANOL FEED

CROSS-REFERENCE TO RELATED APPLICATIONS

This application claims priority from Provisional application No. 60/253,423 filed Nov. 27, 2000.

STATEMENT AS TO FEDERALLY-SPONSORED RESEARCH

The invention described herein was made in the performance of work under a NASA 7-1407 contract, and is subject to the provisions of Public Law 96-517 (35 USC 202) in which the Contractor has elected to retain title.

BACKGROUND

Direct methanol fed fuel cells may be used as energy sources. Miniaturization of these devices may allow the devices to replace rechargeable batteries in certain applications. Such applications may include, for example, cellular telephones, laptop computers, and other small portable electronic devices.

The electrode configuration of these devices may form a critical factor about the performance of such fuel cells. Resistance between interconnects may also form a factor.

SUMMARY

The present application teaches an electrode and interconnect technique which may be more efficient than previous techniques, as well as enabling reduction of size.

BRIEF DESCRIPTION OF THE DRAWINGS

These and other aspects will now be described in detail with reference to the accompanying drawings, wherein.

DETAILED DESCRIPTION

Methanol fuel cells may be constructed as described in U.S. Pat. No. 6,146,781. However, these systems often use bipolar plates, often called "biplates", between the stacks. These bipolar plates may be too large for effective miniaturization.

A flat pack design has been disclosed. This flat pack technique may operate without biplates. Instead, the cells are connected in series on a common membrane plane, using electrical interconnects which are formed through the membrane.

This technique, although compact and lightweight, may result in a higher internal resistance than that of the bipolar cell, which would have the same active electrode areas and the same number of cells.

The higher internal resistance may lower the power density and also lower the efficiency.

Power density that has been attained with a first generation flat pack was in the range of 2–3 mw per centimeter squared. However, it may be desirable to increase that power density, for example to as high as a 8–10 mw/cm$^2$, in order to meet requirements of portable power source applications. The inventors accordingly realized that the high internal resistance of a flat pack may be an important part of increasing power density of the direct methanol fed fuel cell.

The present application teaches a flat pack design which reduces the path length for the current flow, and increases the area of the interconnect. By carrying out both of these objectives substantially simultaneously, the internal resistance may be reduced.

The electrodes of the first embodiment may allow current to flow along the length of the electrodes. The effective path length for the current flow may be given by one arbitrary unit for each 1 cm×1 cm section of the electrode. Thirty units of path length may be used for the six cell pack. For example, all the current through the cells passes through an interconnect area of approximately 0.15 cm$^2$. The ratio of the interconnect area to the electrode area is approximately 0.03. Moreover, the pack has a resistance of about 9.6 ohms.

Figure 1:
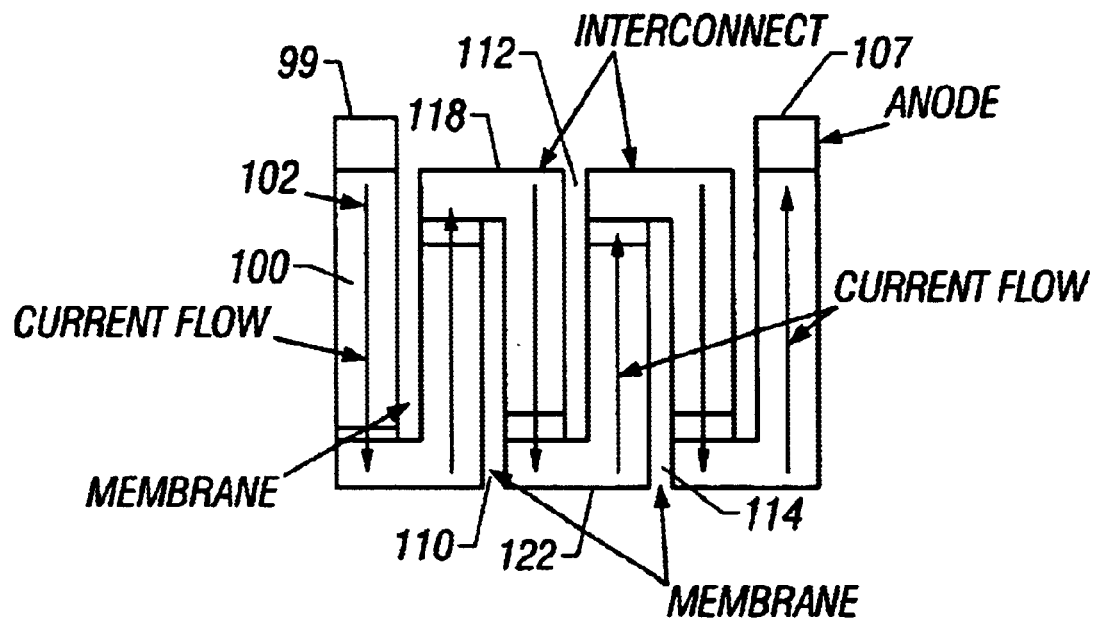
FIG. 1 shows a first interconnect technique.

In the FIG. 1 embodiment, the current flow from a first unit 100 occurs in the direction of the arrow 102. In the embodiment, a common membrane may be used, or membrane parts may be connected.

A number of separate cells are formed, each having electrodes with different parts. Interconnects operate to connect between the respective interconnects. For example, interconnect 118 connects between the cell including membrane 110 and the cell including membrane 112. Similarly, a second interconnect 122 connects between the cell including membrane 112 and the cell including membrane 114. In this embodiment, the cells are connected through the membrane interconnect. The current flows along the length of the cells from one interconnect to the other. Overall current flows from the cathode 99 to the anode 107.

Figure 2:
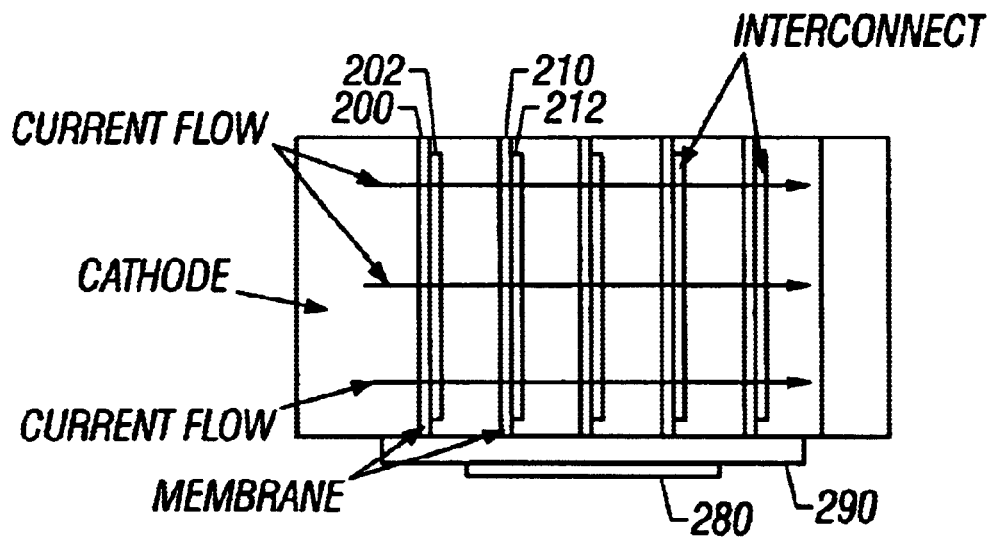
FIG. 2 shows a second interconnect technique, in which the current passes through the membranes and the interconnects.

A second embodiment is shown in FIG. 2. In this embodiment, larger area interconnects are used with parallel current paths. In this embodiment, the current flows in parallel through the width of the cell, along and through the membranes and the interconnects. This system may use a catalyst layer coating and membrane electrode assembly formation of a type which has been known in the art.

A first membrane 200 is planar, as conventional, and the current flow passes through the membrane. An electrode is associated with the membrane. Interconnect 202 is similarly planar, and associated with the electrode and membrane. Similarly, a second membrane 210 is connected using a second interconnect 212. This effectively forms a strip cell in which current flows through the width of the cells, and the cells are connected through the interconnect along almost the entire area of the cell. For example, the interconnect may be over 90 percent of the area of the membrane.

The methanol may be fed to the fuel cells using a wicking part 290 which feeds methanol from a methanol fuel supply 208 to edges of the membranes of the electrochemical cells.

An advantage of this system is that the current flows across the pack. The effective path length is approximately 6/5 units, because there are five parallel segments of resistance, each about equal to six arbitrary units of length. The ratio between the interconnect area and the electrode area is approximately 0.2. Also, the pack has an internal resistance of about three ohms.

In order to formulate this new layout and interconnect, the system uses new types of masks for appropriately overlapping electrodes and interconnects. The interconnect materials which are used are of a type that retain their form prior to curing. In addition, the interconnect material is applied in a controlled manner, as a 1 mm wide line segment.

The masks may be formed of Kapton materials that are 3–5 mils thick. The electrodes are sized appropriately to fit the masks. An interconnect paste is formulated from a high surface area conducting carbon material such as Astbury graphite and that he curing binder in the weight ratio 20:1. Isopropanol is added in small amounts to the paste in order to achieve appropriate consistency. This formation technique results in formable interconnects which do not flow excessively, and which their retain their connection, allow optimum electrode alignment prior to membrane electrode assemblies being hot pressed. The system may be applied using a hypodermic syringe loaded with interconnect paste of an appropriate consistency.

Although only a few modifications have been disclosed in detail above, other modifications are possible. All such modifications are intended to be encompassed within the following claims.

What is claimed is:

1. A fuel cell, comprising:
a plurality of electrochemical cells, each including a plurality of electrodes, associated with the electrochemical cells including an electrochemical anode, an electrochemical cathode and a membrane, said plurality of electrochemical cells arranged in series such that current flows across said membranes;
a plurality of interconnects, between two adjacent electrodes, and wherein each interconnect is at least 20 percent of an area of at least one of said electrodes;
a methanol feed part that feeds methanol to said plurality of electrochemical cells; and
wherein said cells are rectangular with flat faces facing against one another, and edge portions between the faces, and said edge portions extremely substantially perpendicular to said face, said methanol feed part is a wicking part which feeds methanol to only said edge portion of said membranes of said electrochemical cells.

2. A fuel cell as in claim 1, wherein said membranes are formed of a planar structure, and said interconnects are also formed of planar structures of substantially the same size as said electrochemical cells.

3. A fuel cell as in claim 1, wherein said electrochemical cells are arranged such that an anode of one of said electrochemical cells contacts a cathode of another of said electrochemical cells.

4. A fuel cell as in claim 3, wherein said electrochemical cells produce a current which travels along a length of the cell.

5. A fuel cell as in claim 3, wherein said electrochemical cells produce a current which travels along a width of the cell.

6. A fuel cell, comprising:
a plurality of membrane assemblies, arranged substantially adjacent to one another, each membrane assembly being electrochemically active to produce a voltage when an electrochemical reaction occurs;
a plurality of electrodes, in contact with said membrane assemblies;
a plurality of interconnects, located between adjacent ones of said electrodes, wherein a ratio of an area of an interconnect to an area of the electrode is at least 0.2;
a methanol fed part that feeds methanol to said plurality of membrane assemblies; and
wherein said membrane assemblies are rectangular with flat faces facing against one another, and edge portions between the faces, and said edge portions extremely substantially perpendicular to said face, said methanol feed part is a wicking part which feeds methanol to only said edge portion of membranes within said membrane assemblies.

7. A fuel cell as in claim 6, wherein said ratio is substantially 0.2.

8. A fuel cell as in claim 6, wherein said interconnects are formed of a paste.

9. A fuel cell as in claim 8, wherein said paste includes graphite therein.

10. A fuel cell as in claim 8, wherein said paste includes graphite herein and a heat curing binder.

11. A fuel cell as in claim 6, wherein said membrane assemblies each include an anode part, a cathode part, and a membrane part, between said anode and cathode.

12. A fuel cell as in claim 11, wherein said membrane assemblies produce a voltage along a length of the membrane assemblies.

13. A fuel cell as in claim 11, wherein said membrane assemblies produce a voltage along a width of the membrane assemblies.

14. A method of forming a fuel cell as in claim 6, comprising:
forming a plurality of assemblies which are substantially adjacent with one another;
coating said membranes with a catalyst layer coating;
forming interconnects of a paste with a heat curing binder therein, between electrodes associated with said membranes; and
hot pressing, wherein said heat curing binder is heated during said hot pressing said electrodes to form a membrane electrode assembly.

* * * * *